Nov. 10, 1953  R. L. JAESCHKE  2,658,751
TENSION FEED CONTROL
Filed Sept. 20, 1950  4 Sheets-Sheet 1

Ralph L. Jaeschke,
Inventor.
Haynes and Koenig,
Attorneys.

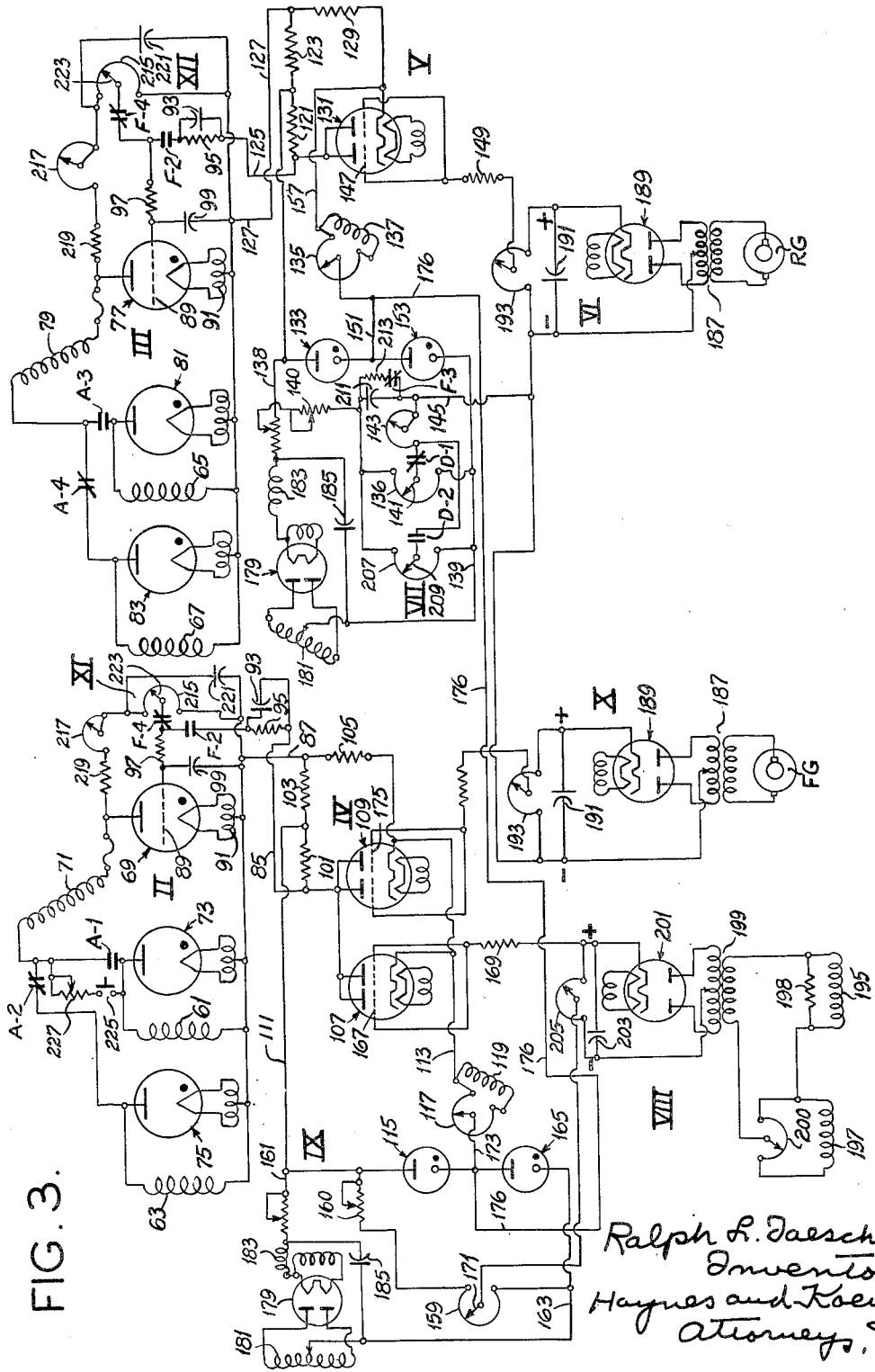

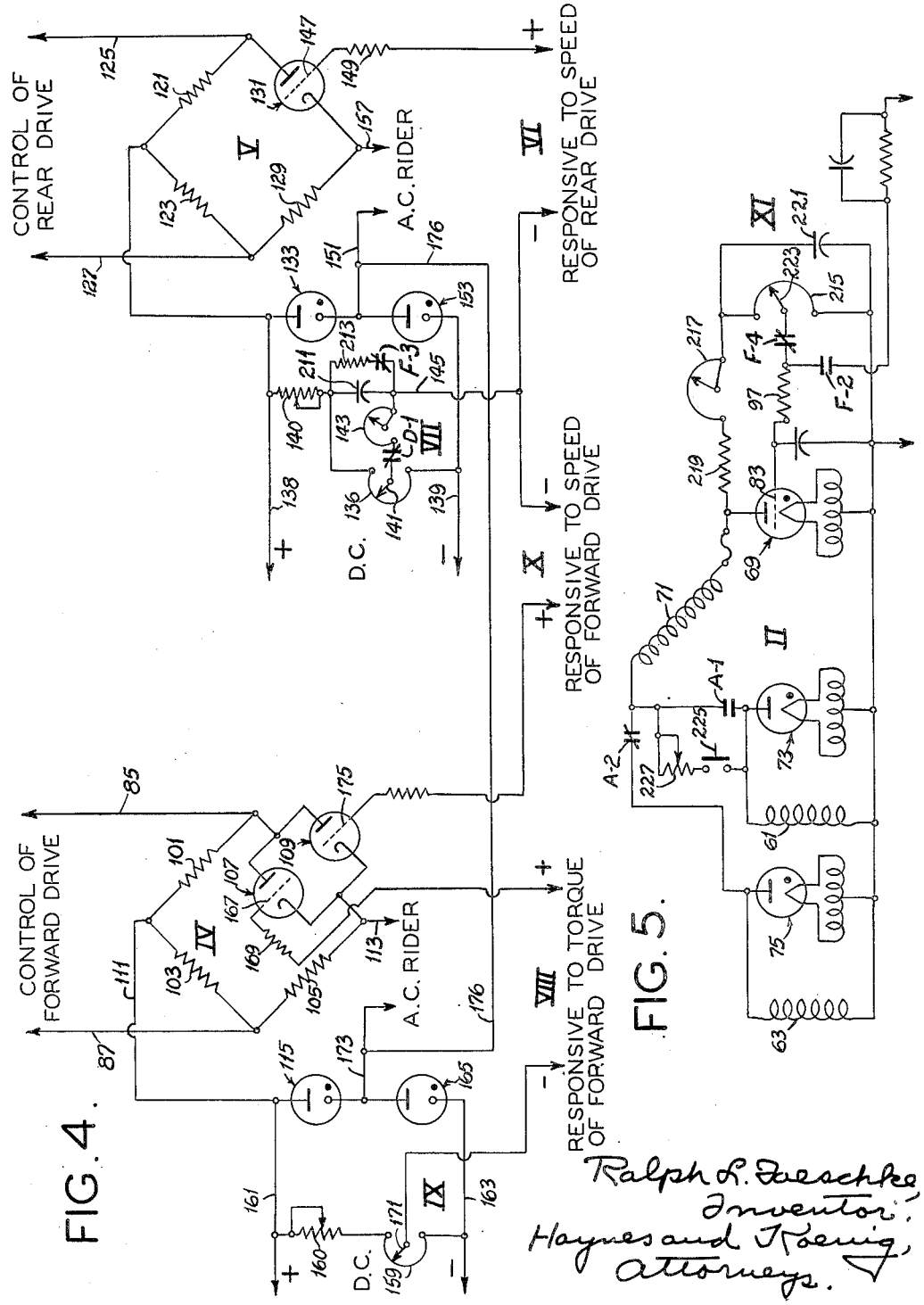

Patented Nov. 10, 1953

2,658,751

UNITED STATES PATENT OFFICE 2,658,751

TENSION FEED CONTROL

Ralph L. Jaeschke, Kenosha, Wis., assignor to Dynamatic Corporation, Kenosha, Wis., a corporation of Delaware Application September 20, 1950, Serial No. 185,893

26 Claims. (Cl. 271—2.3)

This invention relates to controls, and more particularly, to a tension feed control.

Broadly, the invention is directed to a control for a tensioning feed having independently driven rear and forward feed rolls, a rear feed roll being adapted to resist movement of material fed. Uniform rate of speed and constant tension in the material fed is obtained by controlling the power supplied to the rear and forward feed rolls. The control has a circuit responsive to the speed of a rear feed roll controlling the power supplied to the rear feed roll in such manner as to maintain a constant speed, and a second circuit responsive to the torque transmitted to a forward feed roll controlling the power supplied to the forward feed roll so as to maintain constant the torque transmitted to the forward feed roll.

Control of power supplied to the rear and forward feed rolls is achieved by driving the rear and forward feed rolls with electromagnetic clutches. Speed regulation is achieved by feeding into the control a voltage obtained from a generator coupled to the feed rolls. Control of torque is achieved by driving the electromagnetic clutch with an A. C. motor and feeding a voltage into the control circuit responsive to the power drawn by the motor. The control also includes a circuit responsive to the speed of a forward feed roll for regulating the power supplied to the forward feed roll when the rate of speed thereof exceeds the rate of feed of a rear feed roll, as upon a break in the material being fed, thereby preventing run-away of the forward feed roll upon loss of torque.

Provision is also made for braking the rear and forward feed rolls with predetermined adjustable independent braking forces at the same rate and regardless of differences in inertia. This feature of operation is obtained by independently braking the rear and forward feed rolls with controlled electromagnetic brakes wherein the control includes means for adjustably predetermining the excitation of each brake. Another feature of the control is the provision for simultaneously energizing the clutch and brake for the forward feed roll so as to provide a predetermined maximum torque at the forward feed roll while limiting the maximum speed of the forward feed roll when the material is not in tension, as for removing slack in the material. The control includes among other features, means for adjustably limiting rapid changes in power delivered to the feed rolls as upon starting or upon rapid adjustment of the speed-setting means, this latter means being common to the speed- responsive portions of the control circuit for both the rear and forward feed rolls; and a circuit for improved firing control of certain thyratron tubes which are used.

Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a diagrammatic view of a tensioning feed adapted to be controlled by the control of this invention;

Fig. 3 is a circuit diagram of another portion of the control.

Fig. 4 is a simplified schematic circuit diagram of a portion of Fig. 3;

Fig. 5 is another simplified circuit diagram of a portion of Fig. 3; and,

Similar reference characters indicate corresponding parts throughout the several views of the drawings.

Figure 1:
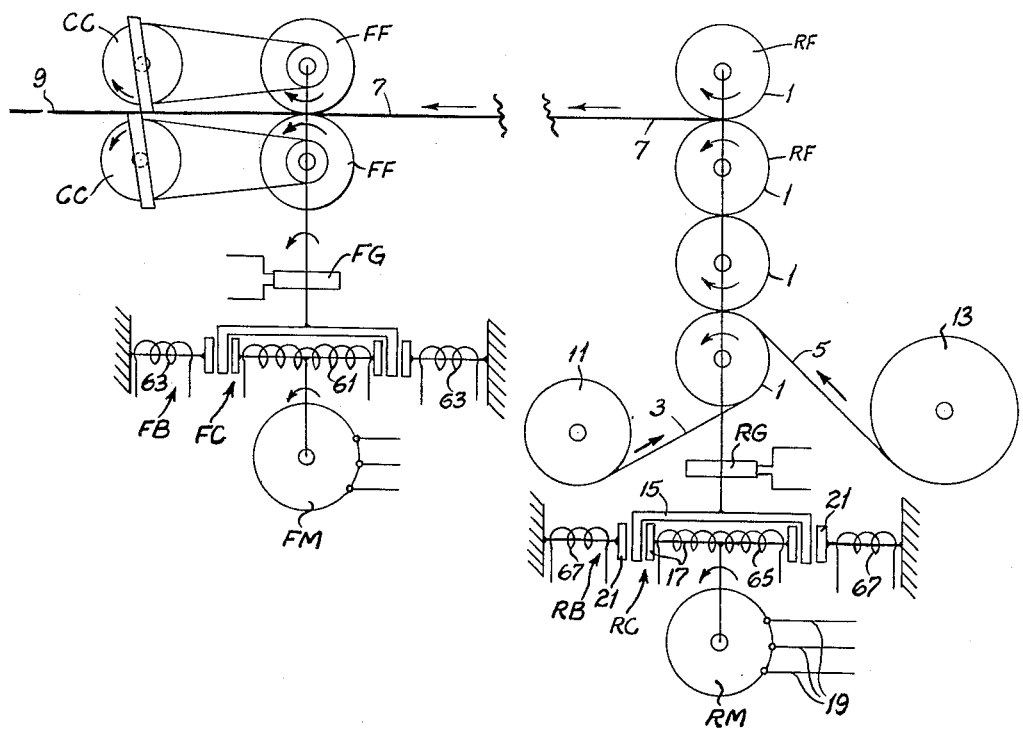

Referring now to Fig. 1 of the drawings, there is shown diagrammatically apparatus for laminating together two webs of paper or the like and cutting it into predetermined lengths. The apparatus includes a stack of laminating rolls 1 into which are fed two webs 3 and 5. It will be understood that adhesive is applied between the webs by suitable means (not shown). The webs are compressed between the rollers 1 adhesively to unite them and are then fed under constant tension from upper rear feed rolls RF through a relatively long straight path to a cutter mechanism having forward feed rolls FF and cutters CC. The laminated web 7 is held under tension in a substantially flat plane so that it will dry and set in a flat plane and will remain flat after cutting. In addition, a predetermined tension is maintained in the laminated web 7 while it is being fed between the rear feed rolls RF and the forward feed rolls FF. This is necessary because the two plys 3 and 5 from which the laminated web 7 is made are frequently of different thickness and moduli of elasticity, and if the tension is too great one of the webs will shrink more than the other, tending to cause curling of the cut lengths 9 in one direction. If the tension is insufficient, the lengths 9 will curl in the opposite direction.

The combination of stacked compressing rollers 1 and the two supply rolls 11 and 13 for the webs 3 and 5 offer considerable resistance to movement of the laminated web 7, and this drag force is generally greater than the desired tension in the laminated web 7. Therefore, the rolls 1 are driven in the direction of feed by supplying variable power depending upon changes in this drag force, such as are caused upon reduction in size of the supply rolls 11 and 13 and upon change in the tension in the laminated web 7. The power supplied to the rolls 1 is controlled by means of an electromagnetic eddy-current slip clutch or coupling RC having a driven inductor element 15 coupled to the stacked rolls 1 including rear feed rolls RF, and a driving field element 17 coupled to a three-phase A. C. constant-speed motor RM supplied by three-phase power lines 19. A small A. C. generator RG is also coupled to the rear feed rolls RF for regulation purposes to be described. Provision for braking the rear feed rolls is had by means of an electromagnetic brake RB which generally comprises a fixed field member 21 cooperating with the inductor element 15 to form an eddy-current brake.

The forward feed rolls FF are similarly driven by a motor FM through a similar slip clutch or coupling FC and are braked by a similar brake FB. The cutters CC are mechanically coupled to the forward feed rolls so as to be driven in synchronism therewith. Also, a generator FG is coupled to the forward feed rolls FF.

It is a purpose of this invention to provide push-button controls for various conditions of operation. The control has means for driving the rear feed rolls RF at an adjustable regulated speed; means for driving the forward feed rolls FF with such power as to maintain a constant tension on the laminated web 7 between the rear feed rolls and the forward feed rolls; means for providing an adjustable predetermined "thread" speed for threading the material through the stacked rolls 1 and into the forward feed rolls; means for providing an adjustable predetermined "inch" speed for purposes of setting up the machinery for a run; means for providing an adjustable predetermined "creep" speed control for removing slack in the laminated web 7; means for starting the rear and the forward feed rolls in synchronism with adjustable predetermined acceleration and, means for stopping the rear and forward feed rolls in synchronism at an adjustable predetermined rate.

Figure 2:
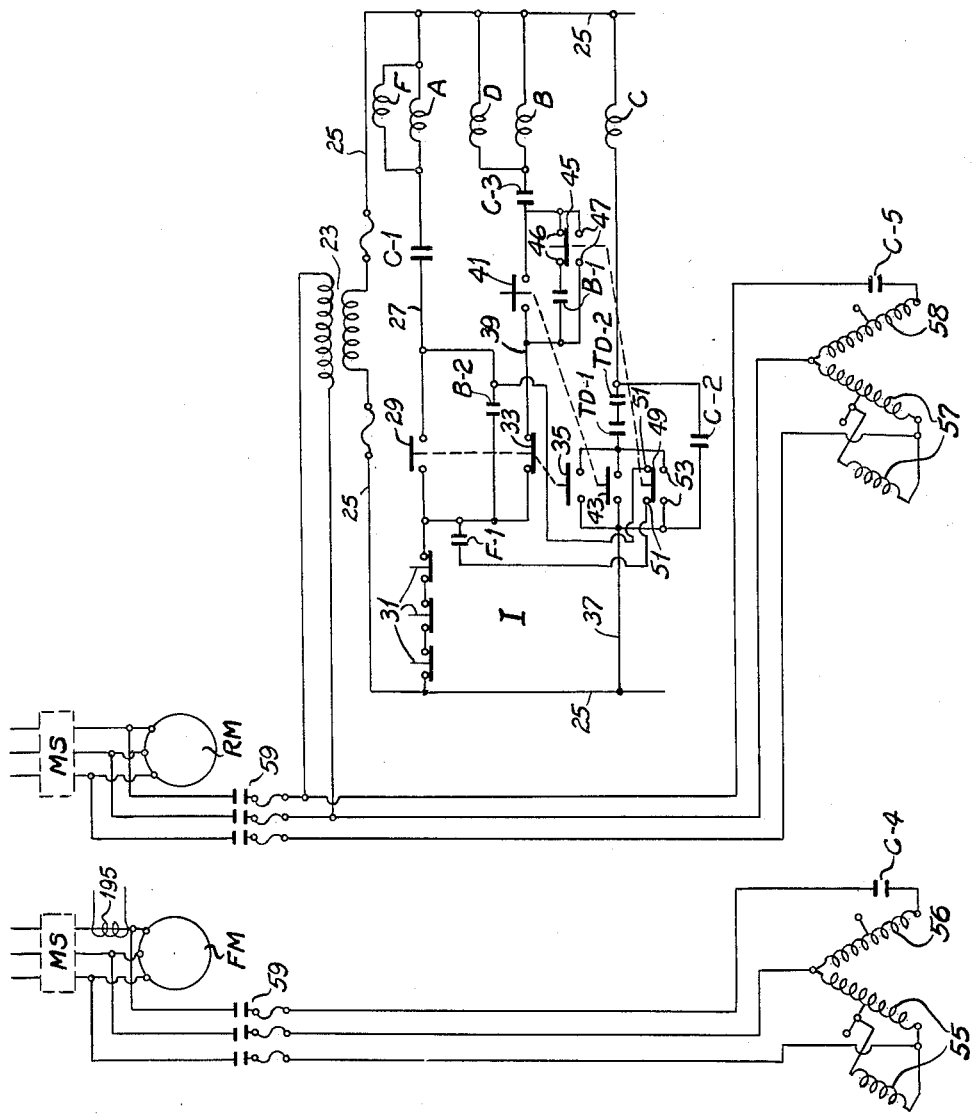
Fig. 2 is a circuit diagram of a portion of the control.

Referring now to the Figs. 2 and 3, for purposes of convenience the control circuit has been divided up into various parts designated I through XII. Circuit I is a manual control relay network for quick changes between the various aforesaid conditions of operation (Fig. 2). This circuit includes an energizing transformer 23 providing a relay voltage across a pair of conductors 25. Connected between the conductors 25 is a run-stop branch 27 including in series a normally open run push-button switch 29 and a plurality of normally closed stop push-button switches 31, it being understood that the stop switches may be positioned in convenient locations with respect to the laminator apparatus. Connected in series with the run and stop switches are a normally open relay switch C-1 and two parallel connected relay coils A and F.

The normally open run switch 29 is mechanically coupled to a normally closed run switch 33 and a normally open run switch 35. Switch 35 is in a branch circuit 37 between the conductors 25 which includes in series with switch 35 a first time-delay switch TD-1, a second time-delay switch TD-2 and relay coil C. The time-delay switches act as protecting means to prevent application of plate voltage to certain thyratrons mentioned below, before their filaments reach correct operating temperature. Each may comprise a thermostatic switch and a heater energized when the filaments of the thyratrons are first energized. Connected around the run switch 35 and the two time-delay switches TD-1 and TD-2 is a relay actuated switch C-2 which operates as a holding switch when coil C is energized, as by actuating any of the switches 35, 43 or 49.

Connected around the run switch 29 and in series with the stop switches 31 is a branch circuit 39 having in series the normally closed switch 33, a normally open push-button thread control switch 41, a normally open relay switch C-3 and relay coils B and D, connected in parallel. This latter branch circuit 39 extends from one of the wires 25 through the stop switches 31 to the other of the supply wires 25. The thread control switch 41 is mechanically coupled in tandem with a normally open switch 43 in the branch circuit 37 and in parallel with the normally open run switch 35.

A push-button inch-control switch is shown at 45. Its normally closed back contacts 46 and a normally open relay switch B-1 are in series around the thread control switch 41. Switch 45 closes upon normally open contacts 47, also connected around the switch 41. Coupled in tandem with this switch 45 is a second double-throw switch 49. Switch 49 is normally closed upon back contacts 51, completing a circuit around the normally open relay switch B-2, which in turn is connected around the run switch 29. A normally open relay switch F-1 is in series with the contacts 51. Switch 49 closes upon normally open front contacts 53 forming a shunt circuit around the "run" switch 35 and the "thread" switch 43 in branch circuit 37.

It will be noted that the normally open switch B-1 and the switch 45 normally closed against contacts 46 act as a holding circuit for the thread control switch 41. There is no holding circuit for the inch control, which is on only so long as its switch is held pushed in. Thus, a holding circuit is established by actuating the run switch 35 or the thread switch 43; but no holding circuit is provided for the inch control switch.

There is also shown in Fig. 2 the rear and forward motors RM and FM, respectively, and their associated motor starters MS. Connected between the forward motor FM and its motor starter MS are primaries 55 and 56 of transformers supplying the control circuit for the forward feed. Transformer primaries 57 and 58, supplying the control circuit for the rear feed, are connected between the rear motor RM and its motor starter MS. The transformer primaries 55 and 57 are protected by suitable fuse disconnect switches indicated at 59 and transformer primaries 56 and 58 are additionally protected by relay switches C-4 and C-5 operated by the relay coil C.

Referring to Fig. 3, there is shown at II a circuit for exciting the clutch and brake for the forward feed and at III a circuit for exciting the clutch and brake for the rear feed. A field coil 61 magnetizes the forward clutch FC and a field coil 63 magnetizes the forward brake FB. In circuit III a field coil 65 controls the rear clutch RC and a field coil 67 controls the rear brake RB. The forward field coils 61 and 63 are variably excited by means of a grid-controlled rectifier or thyratron 69 supplied by a transformer secondary 71. An energizing circuit is provided to the clutch coil 61 through a normally open relay switch A–1 operated by relay coil A and a similar circuit is provided to the brake coil 63 through a normally closed relay switch A–2 operated by coil A. Back-firing rectifiers 73 and 75 are provided for the coils 61 and 63 to smooth out the exciting current.

Circuit III similarly includes a thyratron tube 77 supplied by a transformer secondary 79. The plate transformer secondaries 71 and 79 cooperate with primaries 55 and 58, certain other transformer secondaries of the circuit being supplied by the primaries 55 and 57. The rear clutch coil 65 is energized through a normally open relay switch A–3 and the rear brake coil 67 is energized through a normally closed relay switch A–4, both switches being under the control of relay coil A. Back-firing rectifiers 81 and 83 are provided for the coils 65 and 67 in the same manner as shown in connection with circuit II.

When the forward clutch FC is excited, the thyratron 69 is controlled by a grid signal supplied from a bridge circuit IV, also shown in Fig. 4. A bridge output conductor 85 is connected to the grid 89 of tube 69 through an anti-hunt network consisting of a capacitor 93 in parallel with a resistor 95. A normally open relay switch F–2 actuated by the relay coil F, and a grid-current limiting resistor 97 complete the grid circuit. A small grid-to-cathode capacitor 99 by-passes plate voltage transients. The other bridge output conductor 87 is connected to the cathode of the thyratron through a center-tapped filament transformer secondary 91.

The bridge IV is formed by resistors 101 and 103 connected in series and to the conductors 85 and 87, respectively; and by two parallel-connected triodes 107 and 109 and a resistor 105 connected in series and to the conductors 85 and 87, respectively. A constant D. C. component of input to the bridge IV is supplied across a positive conductor 111 and a negative conductor 113, the former being connected intermediate the resistors 101 and 103 and the latter being connected intermediate the resistor 105 and the triodes 107 and 109. The D. C. voltage component appears across a voltage regulator tube 115 and an A. C. rider is imposed upon this D. C. voltage component by means of a voltage divider 117 supplied from a secondary 119 of the transformer primary 55.

When the rear clutch RC is excited, the thyratron 77 is controlled by a grid signal supplied from a bridge circuit V. The details of connection to the grid and cathode of the tube 77 are the same as described heretofore in connection with tube 69, hence are not repeated. Bridge circuit V includes resistors 121 and 123 connected in series and to bridge output conductors 125 and 127, respectively. Conductor 125 communicates with the grid of tube 77 and conductor 127 leads to the tube's cathode. A resistor 129 and a triode tube 131 are connected in series to form the other two arms of the bridge, the triode being connected on its plate side to conductor 125. This bridge is also supplied with a D. C. voltage component across a voltage regulator tube 133 and an A. C. rider component obtained from a voltage divider 135 supplied from a secondary 137 of primary 57. The voltage across grid conductor 125 and cathode conductor 127 is varied by changing the conductivity of the tube 131. The conductivity or impedance of tube 131 is controlled by a grid bias having a component responsive to the speed of the rear drive and an adjustable speed-setting reference component. The speed-responsive component is supplied by a circuit VI and the speed-setting component is supplied by a circuit VII. Also, an A. C. rider is imposed on the grid bias.

Circuit VII comprises a voltage divider 136 and a resistor 140 connected across a D. C. supply obtained across positive and negative leads 138 and 139, respectively. The movable adjusting arm 141 of the voltage divider 136 is connected through a normally closed relay switch D–1 and an adjustable resistor 143 to a conductor 145 leading to the negative side of the speed-responsive voltage circuit VI. The positive side of the speed-responsive voltage circuit VI is connected through a grid-current limiting resistor 149 to the grid 147 of the triode 131. The circuit is completed from the cathode of tube 131 through the A. C. rider source (voltage divider 135 and secondary 137) and a conductor 151. A voltage regulator tube 153 is connected between the conductor 151 and the negative lead 139 of the D. C. voltage supply.

The D. C. bias applied to the grid 147 of tube 131 depends in part upon the difference in potential between the conductor 151 and the adjusting arm 141 of the voltage divider 136. As arm 141 of voltage divider 136 is adjusted, the potential may be changed above or below the potential of 151.

The bridge circuit IV operates in the same way as the circuit V, with the exception that two independent factors contribute to the D. C. component at the output of the bridge, i. e., at conductors 85 and 87. This voltage depends upon the conductivity of that arm of the bridge defined by the parallel-connected triode tubes 107 and 109. Either tube may assume control of the bridge, the tube having the highest conductivity, and thereby the lowest impedance, being the one in primary control at any instant.

The grid bias for tube 107 includes a D. C. component responsive to the torque transmitted by the forward clutch to the forward feed rolls, and an adjustable torque-setting reference component supplied by circuit IX. Circuit VIII supplies the torque-responsive component.

Circuit IX comprises a voltage divider 159 and a resistor 160 connected between positive and negative leads 161 and 163, and a voltage regulator tube 165. The grid 167 of the tube 107 in bridge circuit IV is connected through a grid-current limiting resistor 169 to the positive side of the torque-responsive circuit VIII. The negative side of the torque-responsive circuit VIII is connected to the adjusting arm 171 of the voltage divider 159. The grid circuit for tube 107 is completed through the A. C. rider source 117 and a conductor 173 connected intermediate the voltage regulator tubes 115 and 165. The adjustable component of bias, as before, depends upon the voltage difference between the conductor 173 and the adjusting arm 171 of voltage divider 159. This adjustable component is in opposition to the component of bias supplied by the torque-responsive circuit VIII. Adjustment of the torque response is provided by adjusting the voltage divider 159.

The other triode 109 in bridge circuit IV has its grid 175 connected to the positive side of a circuit X supplying a D. C. voltage responsive to the speed of the forward drive. The negative side of this circuit X is connected to the conductor 145 connecting with one side of the speed-setting circuit VII. A conductor 176 leads from the other side of the speed-setting circuit VII at 151 to conductor 173. Thus, the grid circuit for tube 109 includes the speed-responsive circuit X for the forward feed, the speed-setting circuit VII, and the A. C. rider source 117. It will be noted that there is a common A. C. rider in the grid signals for tubes 107 and 109 and that the A. C. rider for tube 131 does not interfere with the operation of the first-mentioned tubes. However, the tubes 109 and 131 have a common adjustable D. C. bias which is used for speed-setting purposes. The common speed-setting bias permits the speed control of both the rear and the forward drives to be set by one simple adjustment. At the same time, it is desirable to have a common A. C. rider for both the tubes 107 and 109 in order to have a uniform A. C. signal applied to the control grid of the grid-controlled rectifier 69. In addition the A. C. voltage sources 117 and 135 are arranged so that in-phase A. C. signals appear in both the plate and grid voltages of the tubes 107, 109 and 131. This is desirable because a steeper or more peaked firing signal results and better firing control of the thyratrons is achieved.

The D. C. voltage for the conductors 138 and 139 and for the conductors 161 and 163 may be obtained in any suitable way, the means shown being a conventional rectifying circuit. A full-wave rectifier 179 supplied by a transformer secondary 181, has its output filtered by a series choke 183 and parallel capacitor 185.

The speed-responsive voltage networks VI and X are also similar to each other. Each includes a generator, RG and FG for the rear and forward drives respectively, a transformer 187, a rectifier 189, a shunt filtering capacitor 191, and a voltage divider 193.

The torque-responsive circuit VIII includes a secondary winding of a current transformer 195 for measuring the current to the forward motor and a secondary 197 of a voltage transformer adapted to compensate for changing power factor or reactive current, thereby providing for a straight-line responsive of torque to current drawn by the motor. A load resistor 198 is connected across the secondary of current transformer 195 and a voltage divider 200 is connected across the output side of the voltage transformer 197. The two transformers 195 and 197 and their load resistances 198 and 200 are connected in series. They feed through a transformer 199 to a rectifier 201, the D. C. output being filtered by a shunt capacitor 203 and impressed across a voltage divider 205.

The circuit VIII is similar to that disclosed in the United States patent of Anthony Winther, No. 2,498,057, issued February 21, 1950, for Control Apparatus for Polyphase Systems, and exemplary connections of the transformer primaries associated with secondaries 195 and 197 are shown therein.

To adjust initially circuit VIII an A. C. voltmeter may be connected across the input to transformer 199, and then various across-the-line connections are tried for transformer 197 until the one giving a minimum voltage output at no load, is found. The voltage divider 200 is then adjusted to provide a minimum reading at the voltmeter. That is, the voltage transformer 197 must have a proper rotation and location of output relative to the output of the current transformer. The voltmeter will indicate approximately 1/2 volt output when the adjustment is proper. The improved performance of this part of the control is traced to the fact that the current drawn by an A. C. motor does not vary linearly with the horsepower output, since there is a change in power factor. Thus, it is necessary to cancel out the out-of-phase vector of current due to poor power factor. This is accomplished when the connections for transformers 195 and 197 are such that the output is minimum at no load. The result is a substantially straight-line characteristic of voltage detected at voltage divider 205 in response to horsepower load from 3% to 100% full load. The torque is substantially a constant function of horsepower output, since the speed of an A. C. motor is essentially constant.

Referring to Fig. 3 of the drawings, it will be noticed that the speed-setting control circuit VII includes a second voltage divider 207 in parallel with the voltage divider 136. This second voltage divider has its adjusting arm 209 connected through a normally open relay switch D-2 to the adjustable resistor 143 connecting with conductor 145. Switches D-1 and D-2 are under the control of the relay coil D, which in turn is controlled by the thread control manual switch 41. Thus, it is possible to pre-set independently of one another the run speed and the thread speed, and then switch between them by a simple push-button operation.

Another feature of the speed-setting circuit VII is the provision of a capacitor 211 connected between the conductor 145 and the resistor 140. This capacitor is adapted to prevent rapid changes in the adjustable elements 136 and 207 from being immediately reflected in the grid biases applied to the triodes 131 and 109. Also, the rate of acceleration for the apparatus from standstill is limited. A shunting circuit consisting of a resistor 213 and a normally closed relay switch F-3 provides for discharge of the capacitor when the apparatus is stopped, so that uniform acceleration occurs when the apparatus is again started. The rate of acceleration is adjusted at the resistor 143, which determines the charging rate of the capacitor.

Referring now to Fig. 5, the control includes a circuit XI for adjustably pre-setting the deceleration or stopping force applied to the forward feed FF. Circuit XII for the rear feed RF is similar, hence only circuit XI will be discussed in detail. A voltage divider 215, an adjustable resistor 217 and a resistor 219 are connected in series between the cathode and plate of the thyratron 69. A phase-shifting capacitor 221 is connected around the voltage divider 215, and the adjusting arm 223 of the latter is connected through a normally closed relay switch F-4 and the grid-current limiting resistor 97 to the grid 83 of the thyratron. The purpose of the circuit is to provide an adjustable grid signal for controlling conduction of tube 69 during braking action. The transformer secondary 71 causes an A. C. signal to appear across the voltage divider 215. Adjustment of 217 determines the phase of the signal relative to the plate voltage of the thyratron, and adjustment of 215 determines the amplitude of the signal. Thus, the conductivity of 69 for braking and the excitation of the brake field coil 63 may be pre-set. This signal is applied to the thyratron when F-4 is closed, and F-4 is under the control of relay coil F.

Figure 6:
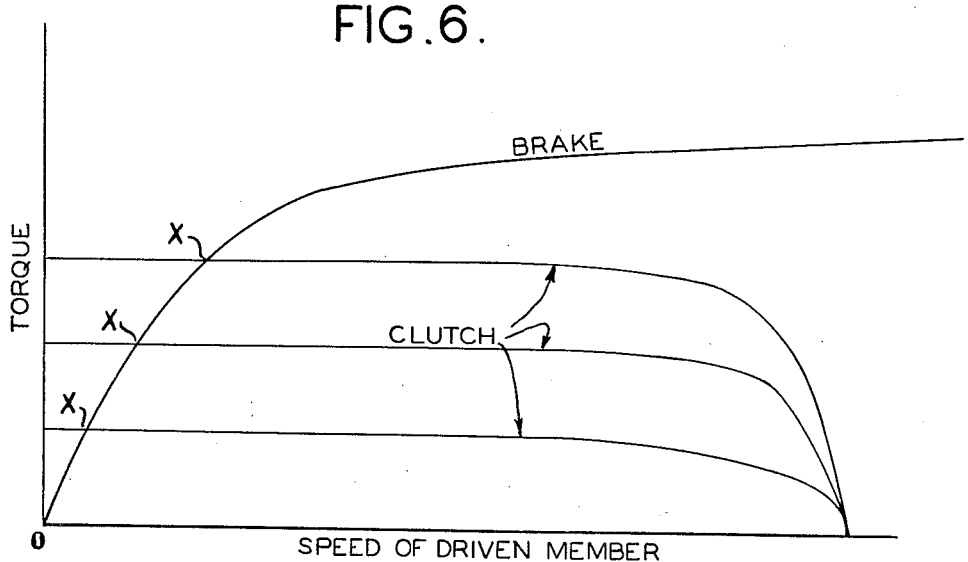
Fig. 6 is a torque-speed graph illustrating certain characteristics of operation.

Figs. 5 and 6 illustrate the creep control feature of the invention. This part of the control is particularly adapted for removing slack in the laminated web 7 between the rear feed RF and forward feed FF. The relay switch A-1 in the circuit to field coil 61 for the forward clutch FC is by-passed by a push-button switch 225 and an adjustable resistor 227. A relatively low adjustable excitation of the forward clutch may be obtained by closing switch 225 while the forward brake FB is also excited. This combination of brake excitation and low clutch excitation at the forward feed gives an ideal condition for removing slack in the web and tensioning the web a predetermined adjustable amount.

The eddy-current brake is a dynamic brake in the sense that it operates only when there is relative rotation between the field and inductor members. There is no braking force at standstill and a correspondingly small amount of braking force at low speeds or low slip. Thus, even a small clutch torque will produce low-speed rotation of the forward feed when the brake is energized. The feed accelerates until an equilibrium speed is reached where the torque transmitted by the clutch substantially equals the torque applied by the brake. Referring to Fig. 6, such equilibrium speeds for different clutch excitations are indicated at X. The clutch excitation is set at 227 so that the clutch transmits a torque (at maximum slip) which provides the desired amount of tension in laminated web 7. When the creep switch 225 is closed, the forward feed rotates to remove slack, the speed of rotation being limited by the braking effect of the forward brake. When the slack is all removed, the tensioned laminated web resists further rotation of the feed FF. The clutch only transmits a small torque, thus the laminated web 7 is held in the desired tension determined by adjustment of the resistor 227.

The various filament transformer secondaries and the heater sources for the time-delay switches are supplied by transformer primaries 55 and 57.

Operation is as follows:

Assume the laminator apparatus and control are in a deenergized or dead condition. In preparing for a run on the apparatus, the first step is to start the motors FM and RM by closing their motor starters MS. Closure of the motor starters establishes circuits to the push-button control circuit I, and to the transformer primaries 55 and 57. The various relay coils A through F in circuit I are not immediately energized since the circuits to these coils are broken at the various switches in the circuit I. The transformer primaries 56 and 58 for the plate circuits of the thyratrons 69 and 77 are not energized since switches C-4 and C-5 are open, but the other parts of the control including the thyratron filaments are energized by means of transformer primaries 55 and 57. Time-delay switches TD-1 and TD-2 begin their time cycles and close after elapse of sufficient time to permit the thyratron filaments to reach correct operating temperature. Premature application of thyratron plate voltage would result in destruction of the tubes.

Once the time-delay switches have closed, the control is ready to operate. Assume it is first desired to thread the webs 3 and 5 through the laminator apparatus. The thread control switches 41 and 43 are manually actuated. Switch 43 completes a circuit through TD-1 and TD-2 to the relay coil C. Switches C-1, C-2, C-3, C-4 and C-5 are closed. Closure of C-2 establishes a holding circuit around the thread control switch 43. C-3 completes a circuit through the thread control switch 41 and normally closed run switch 33 to relay coils B and D. C-4 and C-5 connect the transformer primaries 56 and 58, supplying plate voltage for the thyratrons. Excitation of coil B results in closure of switch B-1, providing a holding circuit around the push-button thread control switch 41. Closure of B-2 completes a circuit through the closed switch C-1 to coils A and F. Thus, all the relays are actuated and holding circuits are established around the two manual switches 41 and 43.

Upon excitation of relay coil A, switches A-1 and A-3 close to complete a circuit from the thyratrons 69 and 77 to the clutch coils 61 and 65, respectively, circuits to the brake coils 63 and 67 being broken by switches A-2 and A-4. At the same time, excitation of coil F causes switches F-2 in the grid circuits for the thyratrons to establish circuits from the bridges IV and V to the grids 89. Circuits XI and XII are disconnected from the grids of the thyratrons by switches F-4. The capacitor 211 in the speed-setting circuit VII is in an uncharged condition initially since normally closed switch F-3 establishes a discharge circuit therefor through resistor 213. When coil F is excited, F-3 opens so as to prepare the capacitor for charging. Excitation of coil D results in disconnection of the voltage divider 136 and connection of voltage divider 207 to the adjustable resistor 143, this being accomplished by switches D-1 and D-2. This completes the operational description of the relays and manual switches which set the control for threading.

Looking to the speed-setting circuit VII, the adjusting arm 209 of voltage divider 207 is at a predetermined potential with respect to the conductor 151. Current flows through the adjustable resistor 143 to charge the capacitor 211. Thus, the conductor 145 initially has potential relative to conductor 151 depending upon the potential at arm 209 and the voltage drop across resistor 143. It will be noted that initially there is no voltage from the speed-responsive sources VI and X, since the generators RG and FG are initially at standstill. The net effect is to apply a relatively positive bias to the grids of the triodes 109 and 131, causing these tubes to have high conductivity and low impedance. The voltage drop across tube 109 is less than the voltage drop across resistor 105 of the bridge IV, and grid bridge output conductor 85 is strongly negative with respect to the cathode bridge output conductor 87. In a like manner the grid output conductor 125 of bridge V is strongly negative with respect to the associated cathode conductor 127.

It will be understood that the output of each bridge IV and V is not constant direct current, since an A. C. component is imposed on the D. C. grid bias of tubes 109 and 131, this A. C. rider being provided by the voltage dividers 117 and 135, respectively. These voltage dividers also produce A. C. riders on the D. C. inputs to the bridges. Thus, two in-phase A. C. rider components are fed to each bridge, one component being fed directly into the bridge and the other component being fed indirectly as part of the grid signal to a triode in one arm of the bridge. The two A. C. components cooperate to provide a wave shape at the output of the bridge particularly adapted to give sharp control over the firing of the thyratrons. The firing signal for the thyratrons is similar to that disclosed in the United States patent of Anthony Winther, No. 2,458,454, issued January 4, 1949, for Electronic Control Apparatus. The present circuit differs from that disclosed in the patent by the provision of an A. C. rider on the D. C. input to the bridge.

The grid signals for the thyratrons are out of phase with the plate voltage. This relation is conveniently obtained in the three-phase system by taking the plate voltages from transformers 50 and 53 connected across two lines of the three-phase supply; and by taking the A. C. grid riders for the thyratron grid signals from transformers 55 and 57 in a different across-the-line connection, as shown in Fig. 2. Thus, the voltage across 56 is 120 degrees out of phase with the voltage across 55. The strongly negative D. C. component of grid signal for the thyratrons holds the tube conduction to a low value. As the D. C. bias is decreased, the firing angle of the thyratrons is advanced to increase tube conduction and field coil excitation. Thus, initially the clutch excitation is low, the clutches FC and RC transmit a low torque and the motors FM and RM are not overloaded.

Referring again to the speed-setting circuit VII, as the charge on the capacitor 211 builds up, the current through 143 decreases and the voltage drop thereacross decreases and eventually is eliminated, it being assumed no grid currents exist. The length of time required for capacitor 211 to charge is determined by the size of the resistor 143, hence is readily adjustable. As the voltage drop across 143 decreases, the conductor 145 approaches the potential of adjusting arm 209 of voltage divider 207, which is normally negative with respect to conductor 151. The grids of tubes 109 and 131 are gradually driven in a negative direction to a value determined by the setting of 207. At the same time, the impedance and voltage drops across the triodes 109 and 131 increase, and the grid output conductors 85 and 125 for bridges IV and V, respectively, are driven in a positive direction. Increased conduction of the thyratrons occurs and the clutches FC and RC transmit more torque. When the capacitor 211 is fully charged, the excitation of the thyratrons assumes a relatively stable value. Thus, both the forward and rear feeds FF and RF are gradually brought up to speed in unison without overloading their respective driving motors. It is of course necessary that both feeds run at approximately the same rate of feed, hence that the acceleration of each corresponds. The speed-responsive sources VI and X apply increasingly positive D. C. voltage to the grids of the tubes 109 and 131 and this is opposed by the speed-setting voltage. Voltage dividers 193 of the speed-responsive voltage sources VI and X permit relative adjustment of acceleration rates.

The voltage dividers 193 of the speed-responsive circuits VI and X are adjusted so that the forward feed FF tends to overrun the rear feed RF by a slight amount and provides for tensioning the laminated web 7. Speed limiting control of forward feed occurs in the event the web does not connect the forward and rear feeds. Such a condition exists when the web is being threaded through the apparatus, and upon a break in the web.

If there is a web connecting the two feeds, and the forward feed is controlled to run at a faster rate than the rear feed, then tension is applied to the web. The torque-responsive circuit VIII for the forward feed is adapted to regulate the amount of torque or tension while the speed-responsive circuit VI for the rear feed regulates the rate of feed. The effect on the bridge IV is such that triode 107 normally has the lower impedance of the two tubes 107 and 109, and thereby assumes control of the bridge. The tension in the web is reflected through the forward clutch FC and the forward motor FM and in the current drawn by the motor. If the proper connections of transformers 195 and 197 have been made, the voltage at 205 is a substantially straight-line characteristic of the delivered motor horsepower, and therefore the torque transmitted by the clutch and the tension in the web.

The torque-setting circuit IV is adjusted to provide a D. C. voltage between the adjusting arm 171 of voltage divider 159 and the conductor 173, which voltage opposes the torque-responsive D. C. voltage across voltage divider 205 to give a net D. C. bias for tube 107. This bias is adjusted at 171 and 205 to provide an excitation of the forward clutch which produces the desired tension in the web.

Speed regulation is accomplished as follows: If the rear feed transiently increases its speed above the desired value pre-set at the voltage divider 207, the output of the rear generator RG increases to drive the grid of the tube 131 in a positive direction. Tube 131 has a lower impedance and the grid output conductor 125 of bridge V becomes relatively more negative. The firing angle of thyratron 77 is retarded and the excitation of the rear clutch decreased, thereby lowering the speed of the rear feed.

Torque regulation is obtained in a similar manner. As the motor current detected by transformer 195 fluctuates in response to load changes, the grid bias of tube 107 is correspondingly varied. The net effect is to increase the excitation of the forward clutch FC when the motor torque and current transiently drops and vice versa, thereby maintaining a desired pre-set tension in the laminated web.

Anti-hunt operation is obtained through the parallel capacitor-resistor networks consisting of 93 and 95. The anti-hunt networks tend to exaggerate the changes in the voltage at the output of bridges VI and V. Thus, a certain increase in bridge output appears as a transiently larger increase at the grids of the thyratrons and vice versa.

Referring back to the manual control circuit I, when it is desired to stop the laminator apparatus, any one of the stop switches 31 is actuated to break the circuits to relay coils A, B, D and F. Coil C remains energized and switches C-1, C-2, C-3, C-4 and C-5 remain in their previous positions. In fact, holding switch C-2 keeps coil C energized until the main power supply is interrupted, as for example at the fuse disconnect switches. Thus, plate voltage is maintained for the thyratrons.

Opening of the circuit to coil A results in a transfer switching operation at switches A-1, A-2, A-3 and A-4 in circuits II and III. The clutch field coils 61 and 65 are disconnected and the brake field coils 63 and 67 are connected into the plate circuits of the thyratrons 69 and 77, respectively. The holding circuits established by switches B-1 and B-2 are also broken. Switches B-1 and B-2 return to their initial conditions wherein voltage divider 136 of circuit VII is reconnected for speed-setting adjustment. De-energization of relay coil F causes the grids of the thyratrons 69 and 77 to be transferred from control by circuits IV and V to the control by circuits XI and XII, this being accomplished by the transfer switching operation at F-1 and F-4. Switch F-3 closes to discharge the capacitor 211 of circuit VII. The over-all effect is to transfer from clutch operation to brake operation, the grid-firing signal for the thyratrons being supplied by circuits XI and XII instead of by bridges IV and V.

The operation of circuits XI and XII is the same, hence only circuit XI is considered. An A. C. voltage appears across the voltage divider 215, which voltage is out of phase with the plate voltage of tube 69 by an amount determined by the capacitor 221 and resistor 217. The actual phase relation or firing angle as adjusted at resistor 217 controls the conductivity of the thyratron and thus the excitation of the brake field coil 63. The two grid circuits XI and XII are adjusted so that the independent dynamic braking forces applied to the forward and rear feeds FF and RF is such as to brake each at equal rates having regard for the different inertia and perhaps different drive speeds. Ideally, the control slows down and stops the two feeds in such manner as to prevent application of increased tension to the laminated web 7 and also to prevent accumulation of slack in the web.

It is to be understood the two brakes FB and RB have similar electromechanical characteristics so that the two braking forces maintain their ratio of braking force at any speed. As the speed of one feed decreases in response to braking action, the dynamic braking force decreases (see Fig. 6). In order for the apparatus to function properly, it is necessary to have similar torque-speed characteristics for the two brakes. Thus, the braking forces applied by the two brakes should decrease uniformly as the speed of each decreases. It follows that once the braking forces have been pre-set at resistors 217 in circuits XI and XII, no further adjustment is required for different clutch or feed speeds. The correlation of braking forces for the two feeds is relatively independent of speed and web tension. It will also be understood the web tension is not normally maintained at standstill, but if such a condition is desired, it may be readily had by means of the creep control described heretofore.

The system is normally operated by actuating the manual run switches 29, 33 and 35. The operation is similar to that described above in regard to actuation of the thread switches. The primary difference is that the speed is set by voltage divider 136 in circuit VII instead of by voltage divider 207. The branch 39 of circuit I is disconnected at switch 33, and coils B and D are not energized during the normal run. Switch F-1 acts as the holding circuit around manual switch 29. Otherwise, the operation is the same as described previously. The control may be shifted from thread to run without stopping, since actuation of run switch 33 will break the branch circuit 39.

The inch control operation had by manual switches 45 and 49 is the same as that given by the thread control, with the exception that no holding circuits are established and that the apparatus is operative only so long as the switches 45 and 49 are manually maintained actuated.

In summarizing, the control of this invention is primarily adapted for a tensioning feed where it is desired adjustably to regulate the rate of feed and the tension in the material fed. An example of such a system has been described in connection with Fig. 1, wherein apparatus is shown for laminating two elongate webs, holding the laminated web in tension for a predetermined time (determined in part by the spacing between the rear and forward feeds and in part by the rate of feed) and cutting the web into predetermined lengths. The control for the rear feed is responsive to the speed of the rear feed and is adapted to regulate the over-all rate of feed. The control for the forward feed is responsive to the torque transmitted and is adapted to regulate the tension in the material fed. The forward control also includes a speed-limiting circuit responsive to the speed of the forward feed and simultaneously adjustable with the speed control for the rear feed to facilitate threading and prevent run-away in the event of a break in the material fed.

A manual push-button control circuit is provided to permit quick changes in the operating conditions, provision being made for running, threading, inching and removal of slack or creeping. In addition, finer control may be obtained by adjusting certain voltage dividers and resistors which permit smooth variation of run, thread and creep speeds as well as of tension in the web. An adjustable acceleration limiting device is included. Provision is also made for independently braking the rear and forward feeds so as to coordinate the braking and prevent the accumulation of slack or undue tension in the web.

The grid circuit for the thyratrons provides for improved firing control over them, it being understood all A. C. voltages are conventional sinusoidal supply voltages.

The term triode as used herein is not in the sense of reference to any particular commercial type of electronic tube but refers to the operative combination of an anode, a cathode and a control grid therefor, regardless of whether or not there are additional elements in any electronic tube incorporating the three above-specified. Also, the term "regulation" is used herein in the sense of maintaining a predetermined value.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A tensioning feed for elongate material comprising rear feed means which would ordinarily resist movement of the material with a drag force greater than the desired tension, an electrically controlled variable-speed drive for rotating the rear feed means in the direction of feed to reduce said tension, a control circuit having speed-detecting means directly responsive to the speed of the rear feed means regulating the speed of the electrically controlled drive for the rear feed means, forward feed means and a second electrically controlled variable-speed drive therefor adapted to feed material at a rate greater than the regulated rate of speed of said rear feed means will permit, said second drive being connected to a second control circuit having means directly responsive to the torque transmitted to the forward feed means regulating the torque supplied to the forward feed means by said second drive.

2. A tensioning feed for elongate material comprising rear feed roll means which would ordinarily resist movement of the material with a drag force greater than the desired tension, an electrically controlled variable-speed drive for rotating the rear feed roll means in the direction of feed, a control circuit including a voltage source responsive to the speed of the rear feed roll means controlling the energization of the electrically controlled drive for the rear feed roll means so as to maintain a predetermined speed, forward feed roll means, a second electrically control drive for rotating the forward feed roll means adapted to feed material at a rate greater than the regulated rate of speed of said rear feed roll means will permit, and a second control circuit having means directly responsive to the torque transmitted to the forward feed roll means controlling the energization of said second electrically controlled drive for the forward feed roll means to maintain a predetermined torque.

3. A tensioning feed for elongate material comprising rear feed rolls which ordinarily would resist movement of the material with a drag force greater than the desired tension, an electrically controlled variable-speed drive for rotating the rear feed rolls in the direction of feed, a control circuit having speed-detecting means directly responsive to the speed of the rear feed rolls regulating the speed of said electrically controlled drive for the rear feed rolls, forward feed rolls, a second electrically controlled variable-speed drive including an A. C. motor and an electromagnetic slip coupling for rotating the forward feed rolls to feed material at a speed tending to be greater than the regulated speed of said rear feed rolls, and a second control circuit having means directly responsive to the current drawn by said A. C. motor controlling the excitation of said electromagnetic slip coupling to maintain a predetermined torque.

4. A tensioning feed for elongate material comprising rear feed rolls which ordinarily would resist movement of the material with a drag force greater than the desired tension, an electrically controlled variable-speed drive for rotating the rear feed rolls in the direction of feed, a control circuit including a voltage source directly responsive to the speed of the rear feed rolls controlling the energization of said electrically controlled drive for the rear feed rolls so as to maintain a predetermined speed, forward feed rolls, a second electrically controlled variable-speed drive including an A. C. motor and an eddy-current slip coupling for rotating the forward feed rolls to feed material at a speed greater than the regulated speed of said rear feed rolls, and a second control circuit having a voltage source directly responsive to the current drawn by said A. C. motor controlling the excitation of said eddy-current slip coupling, said second control circuit being adjustable to vary the tension as desired in the elongate material between the rear and forward feed rolls to maintain a predetermined torque.

5. A control for a tensioning feed having rear and forward feed rolls adapted to feed elongate material therebetween and independently driven and independently braked by rear and forward electromagnetic brakes, comprising first and second grid-controlled rectifiers for independently energizing the rear and forward brakes, a first grid circuit for the first rectifier and a second grid circuit for the second rectifier, adjustable means in said first grid circuit for predetermining the grid signal applied to the first rectifier and adjustable means in said second grid circuit for predetermining the grid signal applied to the second rectifier, and means for simultaneously energizing the brakes, thereby providing for independent predetermined braking forces at the rear and forward feed rolls to slow down and stop the rear and forward feed rolls at substantially the same rate and time regardless of differences in inertia.

6. A control for a tensioning feed having rear and forward feed rolls adapted to feed elongate material therebetween and independently driven respectively by rear and forward electromagnetic clutches and driving motors therefor, comprising first and second grid-controlled rectifiers for independently energizing the rear and forward clutches, a first grid circuit supplying a grid signal to the first rectifier and having means providing a voltage responsive to the speed of the rear feed rolls, and a second grid circuit supplying a grid signal to the second rectifier and having means providing a voltage responsive to the current drawn by the forward motor.

7. A control for a tensioning feed having rear and forward feed rolls adapted to feed elongate material therebetween and independently driven by rear and forward electromagnetic slip clutches and driving motors therefor, comprising first and second grid-controlled rectifiers for independently energizing the rear and forward clutches, a first grid circuit supplying a grid signal to the first rectifier and having means providing a voltage responsive to the speed of the rear feed rolls, a second grid circuit supplying a grid signal to the second rectifier and having means providing a voltage responsive to the current drawn by the forward motor, said second grid circuit additionally having means responsive to the speed of the forward feed rolls for changing the second grid signal when the speed of the forward feed rolls exceeds a predetermined value.

8. A control for a tensioning feed having rear and forward feed rolls adapted to feed elongate material therebetween and independently driven by rear and forward electromagnetic slip clutches and driving motors therefor, comprising first and second grid-controlled rectifiers for independently exciting the rear and forward clutches, a first grid circuit supplying a grid signal to the first rectifier and having means providing a voltage responsive to the speed of the rear feed rolls, a second grid circuit supplying a grid signal to the second rectifier and having means providing a voltage responsive to the current drawn by the forward motor, said second grid circuit additionally having means responsive to the speed of the forward feed rolls for changing the second grid signal when the speed of the forward feed rolls exceeds a predetermined value, and common means supplying an adjustable speed-setting voltage in series with each of these speed-responsive voltages.

9. A control for a tensioning feed having rear and forward feed rolls adapted to feed elongate material therebetween and independently driven by rear and forward electromagnetic slip clutches and driving motors therefor, comprising first and second grid-controlled rectifiers adapted independently to excite the rear and forward clutches, a first grid circuit supplying a grid signal to the first rectifier and having means providing a voltage responsive to the speed of the rear feed rolls, a second grid circuit supplying a grid signal to the second rectifier and having two triodes, means providing a grid bias for one of said triodes responsive to the current drawn by the forward motor, and means providing a grid bias for the other triode responsive to the speed of the forward feed rolls.

10. A control for a tensioning feed having rear and forward feed rolls adapted to feed elongate material therebetween and independently driven by rear and forward electromagnetic slip clutches and driving motors therefor, comprising first and second grid-controlled rectifiers for independently exciting the rear and forward clutches, a first grid circuit supplying a grid signal to the first rectifier and having means providing a voltage responsive to the speed of the rear feed rolls, a second grid circuit supplying a grid signal to the second rectifier and having a bridge, two parallel-connected triodes in one arm of the bridge, means providing a grid bias for one of said triodes responsive to the current drawn by the forward motor, and means providing a grid bias for the other triode responsive to the speed of the forward feed rolls.

11. A control for a tensioning feed having rear and forward feed rolls adapted to feed elongate material therebetween and independently driven by rear and forward electromagnetic slip clutches and driving motors, comprising first and second grid-controlled rectifiers for independently exciting the rear and forward clutches, a first grid circuit supplying a grid signal to the first rectifier and having means providing a voltage responsive to the speed of the rear feed rolls, a second grid circuit supplying a grid signal to the second rectifier and having a bridge, two parallel-connected triodes in one arm of the bridge, means providing a grid bias for one of said triodes responsive to the current drawn by the forward motor, means providing a grid bias for the other triode responsive to the speed of the forward feed rolls, and common means providing an adjustable speed-setting bias in series with each of the speed-responsive voltages.

12. In a control for apparatus having independently driven electrically controlled rear and forward feeds adapted to feed elongate material therebetween, a first triode controlling the speed of the rear feed and a second triode controlling the speed of the forward feed, a first grid circuit for said first triode and a second grid circuit for said second triode, said first grid circuit comprising a means providing a voltage responsive to the speed of the rear feed and means adapted to produce an adjustable reference voltage, said second grid circuit comprising means providing a voltage responsive to the speed of the forward feed and responsive to said means for producing the adjustable reference voltage.

13. In a control for apparatus having independently driven electrically controlled rear and forward feeds adapted to feed elongate material therebetween, a first triode controlling the speed of the rear feed and a second triode controlling the speed of the forward feed, a grid circuit for said first triode comprising means providing an A. C. component of grid signal, means providing a grid signal component responsive to the speed of the rear feed, and means adapted to produce an adjustable reference voltage, a grid circuit for said second triode comprising means providing an A. C. component of grid signal, means providing a grid signal component responsive to the speed of the forward feed and responsive to said means for producing the adjustable reference voltage.

14. A control for a tensioning feed having rear and forward electrically controlled feed adapted to feed elongate material therebetween, comprising a first thyratron controlling the rear feed and a second thyratron controlling the forward feed, a first bridge circuit having a triode in one of its arms supplying a grid signal for the first thyratron, a second bridge circuit having two parallel-connected triodes in one of its arms supplying a grid signal for the second thyratron, a D. C. voltage source and an A. C. voltage source connected in series across the input to each bridge circuit, the grid circuit of the triode in said first bridge circuit including a D. C. voltage source responsive to the speed of the rear feed, a first A. C. voltage source and a first adjustable D. C. voltage source; the grid circuit of one of the triodes in the second bridge circuit including a D. C. voltage source responsive to the speed of the forward feed, a second A. C. voltage source and said first adjustable D. C. voltage source; the grid circuit of the other triode in said second bridge circuit including a D. C. voltage source responsive to the torque transmitted to the forward feed, said second A. C. voltage source and a second adjustable D. C. voltage source.

15. A control for a tensioning feed having rear and forward electrically controlled feeds adapted to feed elongate material therebetween, comprising a first thyratron controlling the rear feed and a second thyratron controlling the forward feed, a first bridge circuit having a first triode in one of its arms supplying a grid signal for the first thyratron, a second bridge circuit having second and third parallel-connected triodes in one of its arms supplying a grid signal for the second thyratron, a D. C. voltage source and a first A. C. voltage source feeding the first bridge, a D. C. voltage source and a second A. C. voltage source feeding the second bridge, the grid circuit of said first triode including a D. C. voltage source responsive to the speed of the rear feed, said first A. C. voltage source and a speed-setting adjustable D. C. voltage source; the grid circuit of said second triode including a D. C. voltage source responsive to the speed of the forward feed, said second A. C. voltage source and said speed-setting adjustable D. C. voltage source; the grid circuit of said third triode including a D. C. voltage source responsive to the torque transmitted to the forward feed and a tension-setting adjustable D. C. voltage source.

16. A control as set forth in claim 15 wherein the speed-setting adjustable D. C. voltage source includes reactive impedance means connected to prevent rapid changes in said adjustable D. C. voltage source from being immediately reflected in the grid signals for the first and second triodes thereby to prevent excessive acceleration of the feeds.

17. An electronic control circuit for dynamoelectric apparatus comprising a triode controlling the speed of the dynamoelectric apparatus, a grid circuit for said triode including in series means providing a D. C. speed-responsive voltage and a speed-setting voltage divider, a constant D. C. voltage supply across the voltage divider, a resistor connected to the adjusting arm of the voltage divider, a capacitor connected on the other side of said resistor and to one side of said constant D. C. voltage supply, the capacitor being adapted to prevent rapid changes of the voltage divider from being immediately reflected in the grid signal for said triode and thereby prevent excessive acceleration of the dynamoelectric apparatus.

18. In a control for rear and forward feeds adapted to feed elongate material therebetween, a first triode controlling the speed of the rear feed and a second triode controlling the speed of the forward feed, a grid circuit for the first triode including in series a D. C. voltage source providing a voltage responsive to the speed of the rear feed and an adjustable speed-setting D. C. voltage source, a grid circuit for the second triode including in series a D. C. voltage source providing a voltage responsive to the speed of the forward feed and said adjustable speed-setting D. C. voltage source, and a capacitor-resistance network in said adjustable D. C. voltage source adapted to prevent rapid changes in the adjustable D. C. voltage source from being immediately impressed on the grids of said triodes thereby to prevent excessive acceleration of the feeds.

19. A control for apparatus having an electrically controlled clutch and an electrically controlled brake, comprising a thyratron, first transfer switch means for switching the thyratron for energization of the clutch or energization of the brake, a first grid circuit for the thyratron supplying a first adjustable grid signal and a second grid circuit for the thyratron supplying a second adjustable grid signal, and second transfer switch means for switching the thyratron to either grid circuit, said first and second transfer switch means being coordinated for simultaneous operation.

20. A tensioning feed comprising rear and forward feed rolls adapted to feed elongate material therebetween, an electrically controlled rear drive and an electrically controlled forward drive, an electrically controlled rear brake and an electrically controlled forward brake, a first thyratron and a second thyratron, first transfer switch means for alternatively connecting the first thyratron for control of the rear drive or rear brake, second transfer switch means for alternatively connecting the second thyratron for control of the forward drive or forward brake, two independently adjustable grid circuits for the first thyratron and associated third transfer switch means, and two independently adjustable grid circuits for the second thyratron and associated fourth transfer switch means, the four transfer switch means being coordinated for simultaneous operation.

21. A tensioning feed comprising rear and forward feed rolls adapted to feed elongate material therebetween, a rear electromagnetic clutch and a forward electromagnetic clutch, a rear electromagnetic brake and a forward electromagnetic brake, each of said clutches and brakes having a field coil, a first thyratron and a second thyratron, first transfer switch means for alternatively connecting the first thyratron to the rear clutch coil or rear brake coil, second transfer switch means for alternatively connecting the second thyratron to the forward clutch coil or forward brake coil, two independently adjust- able grid circuits for the first thyratron and third associated transfer switch means, and two independently adjustable grid circuits for the second thyratron and fourth associated transfer switch means, the four transfer switch means being coordinated for simultaneous operation.

22. A tensioning feed as set forth in claim 21, having back rectifiers for each clutch field and each brake field coil.

23. A tensioning feed comprising rear and forward feed rolls adapted to feed elongate material therebetween, a forward electromagnetic slip coupling and a forward electromagnetic dynamic brake coupled to said forward feed rolls, a first control circuit for adjustably energizing the slip coupling, a second control circuit for adjustably energizing the brake, transfer switch means for alternatively connecting and disconnecting said first and second control circuits, a third control circuit for energizing the slip coupling, and switch means for simultaneously connecting said second and third control circuits.

24. An electronic control circuit for controlling direct current supplied to a load, comprising a thyratron, an A. C. plate supply for the thyratron, a grid circuit for said thyratron, a triode in said grid circuit, a plate supply voltage for said triode having a D. C. component and a sinusoidal A. C. rider in fixed out-of-phase relation with the plate voltage of said thyratron, and means providing a grid signal for said triode having a variable D. C. component and a sinusoidal A. C. rider, the A. C. rider in the grid signal for said triode being in phase with the A. C. rider in the plate supply for said triode.

25. An electronic control circuit comprising a thyratron, a bridge circuit having a triode in one arm of the bridge, the output of the bridge being fed to the grid of the thyratron, a D. C. voltage source and an A. C. voltage source connected in series across the input to the bridge, the grid circuit of said triode including a source of A. C. voltage and a second source of D. C. voltage.

26. An electronic control circuit comprising a thyratron, a bridge circuit having a triode in one of its arms, the output of the bridge being fed to the grid of the thyratron, a D. C. voltage source and an A. C. voltage source connected in series across the input to the bridge, and a second D. C. source and said A. C. source connected in series in the grid circuit of said triode.

RALPH L. JAESCHKE.

References Cited in the file of this patent

UNITED STATES PATENTS

| Number | Name | Date |
|---|---|---|
| 747,996 | French | June 27, 1933 |
| 2,231,582 | Knight | Feb. 11, 1941 |
| 2,233,060 | Parvin | Feb. 25, 1941 |
| 2,242,435 | Parvin et al. | May 20, 1941 |
| 2,277,284 | Winther | Mar. 24, 1942 |
| 2,285,246 | Winther | June 2, 1942 |
| 2,322,754 | Undy | June 29, 1943 |
| 2,411,122 | Winther | Nov. 12, 1946 |
| 2,412,163 | Lundborg | Dec. 3, 1946 |
| 2,469,706 | Winther | May 10, 1949 |
| 2,471,505 | Winther | May 31, 1949 |
| 2,512,017 | Hayes | June 20, 1950 |